US010642075B1

(12) United States Patent
Bennett et al.

(10) Patent No.: US 10,642,075 B1
(45) Date of Patent: May 5, 2020

(54) APPARATUS AND METHOD FOR PRODUCING RAPID AND ACCURATE LASER PHASE SHIFTS

(71) Applicant: BAE Systems Information and Electronic Systems Integration Inc., Nashua, NH (US)

(72) Inventors: Aaron W Bennett, Merrimack, NH (US); Daniel J Creeden, Bloomfield, CT (US); Brant M Kaylor, Merrimack, NH (US); Scott D Setzler, New Boston, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 458 days.

(21) Appl. No.: 15/717,328

(22) Filed: Sep. 27, 2017

(51) Int. Cl.
G02F 1/01 (2006.01)
H01S 3/10 (2006.01)
G01S 7/484 (2006.01)
H01S 3/00 (2006.01)

(52) U.S. Cl.
CPC ............ G02F 1/0121 (2013.01); G01S 7/484 (2013.01); H01S 3/0085 (2013.01); H01S 3/10053 (2013.01); G02F 2201/58 (2013.01); G02F 2203/11 (2013.01)

(58) Field of Classification Search
CPC .. G02F 1/0102; G02F 1/0121; G02F 2203/50; G02F 2201/58; G02F 2203/11; G01S 7/484; H01S 3/0085; H01S 3/10053

See application file for complete search history.

(56) References Cited

U.S. PATENT DOCUMENTS

| 5,815,250 A | 9/1998 | Thomson et al. |
| 6,233,085 B1 * | 5/2001 | Johnson ................ G02F 1/0121 356/5.09 |
| 6,388,739 B1 * | 5/2002 | Rice ........................ G01H 9/00 356/28.5 |

(Continued)

OTHER PUBLICATIONS

Daniel O. Hogenboom and Charles A. Dimarzio, Quadrature detection of a Doppler signal, Applied Optics, May 1, 1998, pp. 2569-2572, vol. 37, No. 13.

(Continued)

Primary Examiner — Eric L Bolda
(74) Attorney, Agent, or Firm — Maine Cernota & Rardin (57) ABSTRACT

A phase controller for rapid, accurate, stable phase shifting of a continuous wave (cw) laser output combines and adjusts reference paths from before and after an EOPM to obtain maximum constructive interference when the EOPM control voltage is zero. A control voltage V for maximum destructive interference is then determined and regulated to produce and maintain a 180 degree phase shift. The output phase can then be shifted by switching the control voltage to the output of a voltage shifter that shifts V by a specified percentage. The phase shifter can divide the control voltage in half to provide a 90 degree phase shift. The cw laser can function as a seed to a pulsed laser, thereby controlling the pulse phases. Quadrature phase laser pulse pairs can be used for quadrature LiDAR detection. Embodiments include a plurality of voltage shifters for 4-phase quadrature shifting and/or shifting between arbitrary phase values.

16 Claims, 7 Drawing Sheets

(56) References Cited

U.S. PATENT DOCUMENTS

| | | | | |
|---|---|---|---|---|
| 7,877,020 B1* | 1/2011 | Hayes | ............... | H04B 10/50 |
| | | | | 398/183 |
| 2002/0005975 A1* | 1/2002 | Nakamoto | ............ | G02F 1/0121 |
| | | | | 359/254 |
| 2003/0184838 A1* | 10/2003 | Akiyama | .............. | G02F 1/0121 |
| | | | | 359/239 |
| 2017/0070297 A1* | 3/2017 | Park | ............... | H04B 10/516 |
| 2017/0285373 A1* | 10/2017 | Zhang | ................ | G02B 6/29344 |

OTHER PUBLICATIONS

Narasimha S. Prasad, Albert Dimarcantonio, and Van Rudd, Development of Coherent Laser Radar for Space Situational Awareness Applications, 9 pages.

\* cited by examiner

APPARATUS AND METHOD FOR PRODUCING RAPID AND ACCURATE LASER PHASE SHIFTS

FIELD

The disclosure relates to detection of laser light, and more particularly to phase control of laser light.

BACKGROUND

Quadrature detection of radio and microwave signals is a powerful and ubiquitous tool used in diverse fields such as nuclear magnetic resonance, MRI imaging, and radar for improving sensitivity and obtaining additional information from the received signals. The traditional approach to measuring both components of a complex signal is to direct the signal to two separate, phase-sensitive detectors having reference inputs that are in quadrature. This is the technique that is commonly used for quadrature detection of radio frequency and microwave signals. However, the use of multiple optical detectors for quadrature detection of laser signals can be undesirable, due to large size, high weight, high power consumption, and/or high cost. Also, the short optical wavelengths of laser signals make it difficult to accurately maintain a quadrature phase relationship between detector references, because variations in temperature and other factors make it virtually impossible to maintain path lengths constant to within a fraction of a wavelength.

Another approach for obtaining quadrature detection of reflected infrared signals, such as are received in LiDAR, is to use a doublet laser excitation pulse, whereby two pulses that are 90 degrees out of phase with each other are transmitted in sequence, whereby the two reflected signals represent the real and imaginary components of the complex response. However, it can be difficult to maintain an accurate quadrature relationship between the two pulses in a doublet laser excitation, due to thermal and other effects. Furthermore, it is often necessary for the two pulses to be spaced very close to each other, so as to avoid artifacts due to movement of detected targets.

Accordingly, the phase shift between the two pulses in quadrature doublet pulse LiDAR excitation must be very fast, as well as highly accurate. Any noise in the phase relationship will significantly limit system performance, and long delays between the pulses will introduce motion artifacts.

What is needed, therefore, is an apparatus and method for rapid, accurate, and stable quadrature phase shifting of doublet laser pulses.

SUMMARY

An apparatus and method for rapid, accurate, and stable quadrature phase shifting of doublet laser pulses is disclosed. The apparatus includes two lasers, one of which is a continuous wave laser that is used to "seed" and thereby to control the phase of the other laser, which is a pulsed laser. The output of the seed laser is divided between a seed path and a first reference path. A first electro-optic phase modulator (EOPM) is used to shift the beam in the seed path between two quadrature phases before it is directed to the pulsed laser. Periodic or near-continuous monitoring and calibration of the first EOPM is used to maintain the accuracy of the quadrature phase shift between the pulses in the pulse pairs.

The phase shift produced by an EOPM is generally linear as a function of the applied control voltage. However, the degree of phase shift that results from a given level of control voltage can vary with temperature and other factors. The disclosed apparatus and method actively monitors and compensates for this effect using a closed loop phase locking apparatus and method.

In embodiments, the output of the first EOPM is divided between a seed beam that is directed to the pulsed laser and second reference path that is combined with the first reference path and directed to a detector such as a photodiode detector. A second EOPM included in the second reference path is used to adjust the two reference paths such that they are in phase when the phase shift of the first EOPM is zero, i.e. when the first control voltage applied to the first EOPM is zero. Since the phase change required from the second EOPM will be half a wavelength at most, the "second" control voltage that is required to bring the two reference paths into phase will be low.

The "first" control voltage is then adjusted to a "first" value V that causes the two reference beams to be precisely opposite in phase at the detector, indicating a phase shift of 180 degrees by the first EOPM. This "first value" V of the first control voltage is then actively regulated, based on the output of the detector, so as to maintain the 180 degree phase shift of the first EOPM.

Having established a calibrated and regulated control voltage V that provides a reliable first EOPM phase shift of 180 degrees, accurate phase shifts of other values can be produced by appropriate increases or reductions of V. In particular, an accurate phase shift of 90 degrees can be produced by reducing the first control voltage to V/2. Accordingly, the speed with which the seed laser phase, and thereby the pulse laser phase, can be shifted depends mainly on the phase shift speed of the first EOPM, which is quite fast.

A first general aspect of the present disclosure is a phase control apparatus for accurately shifting the output of a continuous wave (cw) laser between two phases. The apparatus includes a first voltage-controlled phase shifter configured to receive an input laser signal from the cw laser and provide a laser seed beam and a reference signal; a first phase shifter control system that includes an adjustable first control voltage source, configured to generate a first control voltage, a voltage shifter, configured to shift the first control voltage by a specified percentage, and a voltage selector configured to select between an output voltage from the first control voltage source and an output voltage of the voltage shifter, and to apply the selected output voltage to control the first phase shifter; a second voltage-controlled phase shifter, configured to adjust a phase of the reference signal to produce a phase adjusted reference signal; an adjustable second control voltage source, configured to apply a second control voltage to the second voltage-controlled phase shifter; a detector, configured to provide a detector output that is responsive to the input laser signal and the phase adjusted reference signal, such that the detector output varies according to constructive and destructive interference between the input laser signal and the phase adjusted reference signal; and a feedback system configured to adjust the first control voltage source so as to minimize the detector output.

In embodiments, the first and second phase shifters are electro-optic phase modulators. In any of the above embodiments, the cw laser can be an infra-red laser. In any of the above embodiments, the detector can be a photodiode detector.

In any of the above embodiments, the feedback system can include a servo that adjusts the first control voltage source. Any of the above embodiments can further include a switch configured to enable and disable control of the first control voltage source by the feedback system.

In any of the above embodiments, the feedback system can include a signal generator that imposes a time-variation onto the second control voltage, thereby imposing the time-variation onto the detector output, and a frequency discriminator configured to discriminate and isolate a component of the detector output upon which the time-variation has been imposed, said frequency discriminator being configured to receive a reference signal from the signal generator. In some of these embodiments the frequency discriminator is a lock in amplifier.

In any of the above embodiments, the voltage shifter can be configured to reduce the first control voltage by fifty percent.

In any of the above embodiments, the apparatus can include a plurality of voltage shifters, and the voltage selector can be configured to select between any of the output voltage from the first control voltage source and the output voltages of the voltage shifters. In some of these embodiments, the apparatus comprises three voltage shifters and is able to shift the output beam between four quadrature phases.

A second general aspect of the present disclosure is a method of shifting a phase of a continuous wave (cw) laser output. The method includes directing the cw laser output through a phase control apparatus to produce a laser seed beam having a laser seed phase, the phase control apparatus being controlled by a first control voltage, detecting an interference between the cw laser output and the laser seed beam, and determining therefrom a value V of the first control voltage at which a seed beam phase shift of the laser seed beam is 180 degrees as compared to a phase of the laser seed beam when the first control voltage is zero, configuring a voltage shifter to provide a shifted output voltage that is a specified fraction of V, said fraction being designated as F, regulating V to maintain the seed beam phase shift at 180 degrees, and when a change of the output phase is desired, disabling the regulation and causing a voltage selector to direct the shifted output voltage to the phase control apparatus in place of the first control voltage, thereby changing the seed beam phase shift to a value equal to 180 degrees times F.

Embodiments further include causing the voltage selector to select the first control voltage and switching the feedback system on, thereby returning the seed beam phase shift to 180 degrees.

Any of the above embodiments can further include periodically repeating the step of detecting the interference between the cw laser output and the laser seed beam, and determining therefrom the value V of the first control voltage at which the seed beam phase shift is 180 degrees.

A third general aspect of the present disclosure is a method of obtaining quadrature LiDAR detection. The method includes providing a pulsed laser, a continuous wave (cw) laser, and a phase control apparatus configured to direct an output of the cw laser through a voltage-controlled phase shifter to provide a seed beam to the pulsed laser, detecting an interference between the output of the cw laser and the seed beam, and determining therefrom a value V of a first control voltage at which a seed beam phase shift of the seed beam is 180 degrees as compared to a phase of the seed beam when the first control voltage is zero, configuring a voltage shifter to provide a shifted output voltage that is one half of V, regulating V to maintain the seed beam phase shift at 180 degrees, causing the pulsed laser to emit a first laser pulse, detecting a first LiDAR response as a first component of the quadrature LiDAR detection, causing the voltage selector to direct the shifted output voltage to the phase shifter in place of V, thereby changing the seed beam phase shift to approximately 90 degrees, causing the pulsed laser to emit a second laser pulse, and detecting a second LiDAR response as a second component of the quadrature LiDAR detection.

In embodiments, the pulsed laser is an infrared laser.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1:
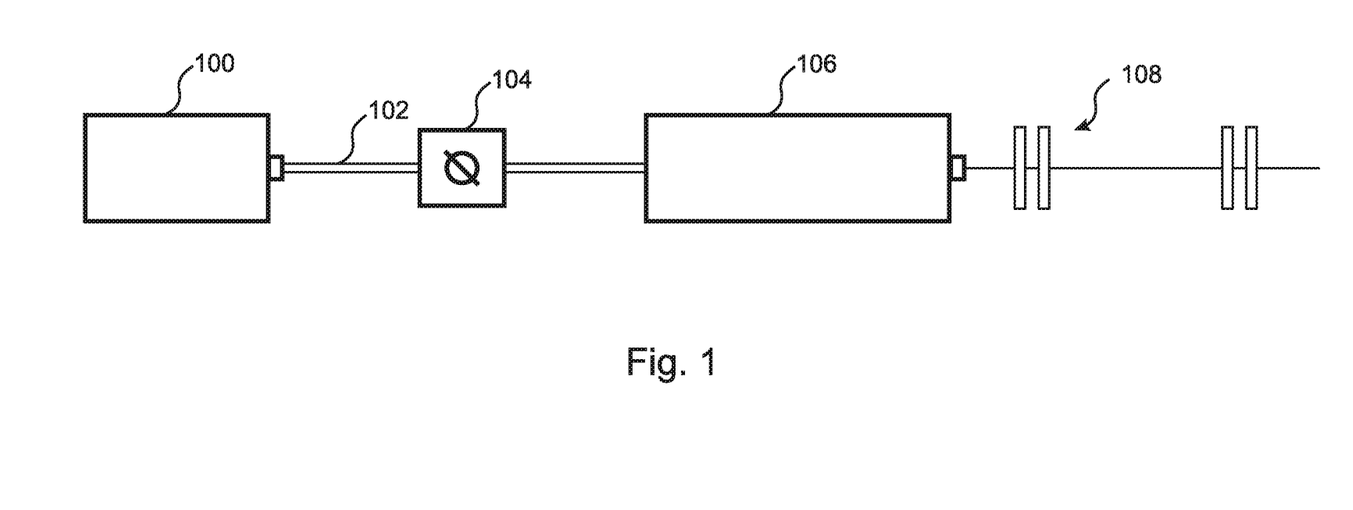
FIG. 1 is a simplified block diagram of a phase controlled pulsed laser system in an embodiment.

The presently disclosed apparatus and method provide for rapid, accurate, and stable quadrature phase shifting of doublet laser pulses. With reference to FIG. 1, the apparatus includes a continuous wave (cw) laser 100 and a pulsed laser 106, whereby the output 102 of the cw laser 100 is used to "seed" the pulsed laser 106. So as to produce quadrature laser pulse pairs, a controller (not shown) directs the pulsed laser 106 to produce a pair of closely spaced output pulses 108, and simultaneously directs a phase shifting module 104 to shift the cw output 102 of the seed laser 100 by 90 degrees between the two pulses 108 in each pair.

Figure 2:
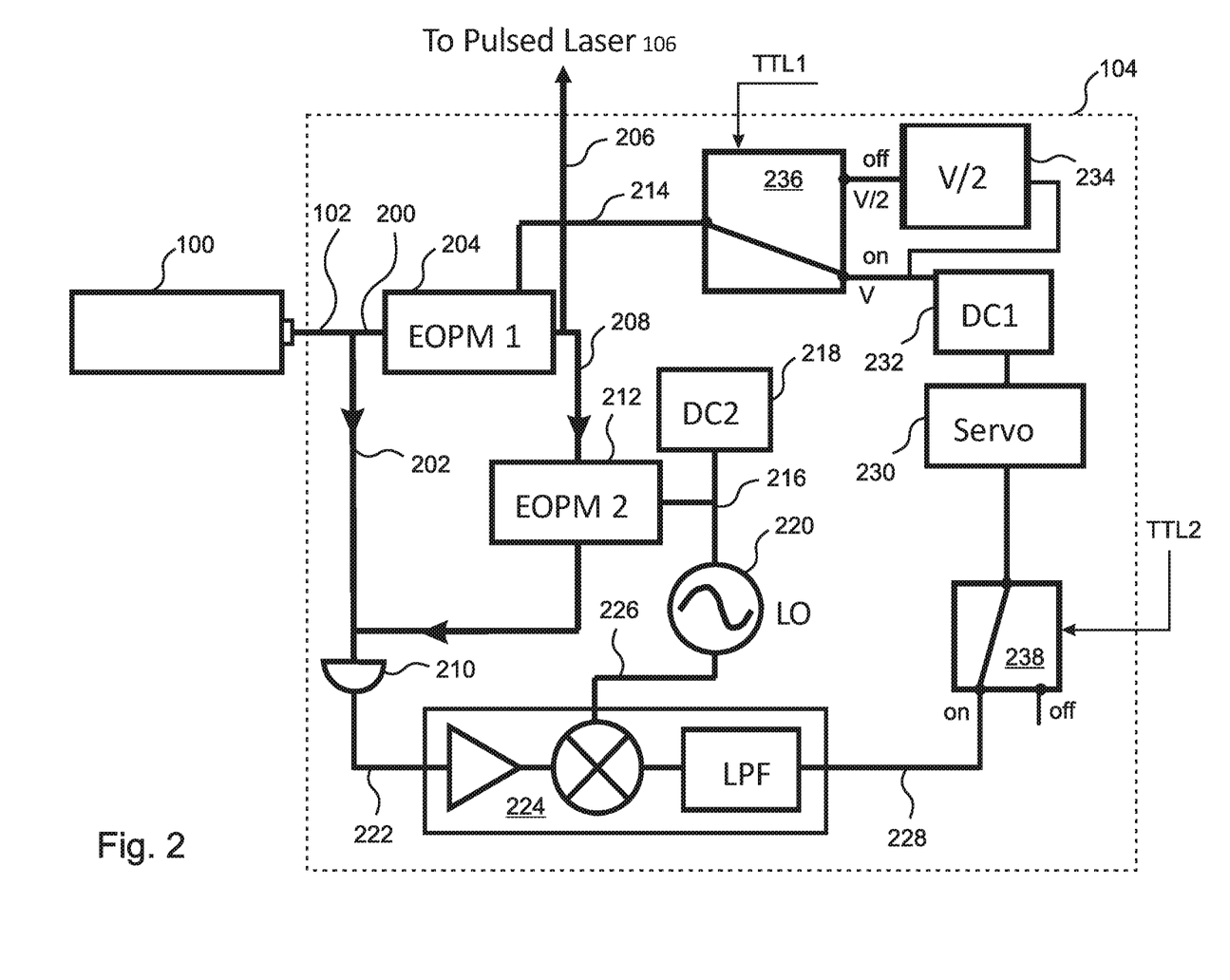
FIG. 2 is a block diagram of a phase controller in an embodiment.

With reference to FIG. 2, the output 102 of the seed laser 100 is divided between a seed path 200 and a first reference path 202. A first electro-optic phase modulator (EOPM) 204 is used to phase shift the beam in the seed path 200 between two quadrature phases before it is directed to the pulsed laser 106. Periodic or continuous monitoring and calibration of the first EOPM are used to maintain the accuracy of the quadrature phase shift between pulse pairs, as discussed below.

The phase shift produced by an EOPM is generally linear as a function of the applied control voltage. However, the degree of phase shift that results from a given level of control voltage can vary with temperature and other factors. The disclosed apparatus and method actively monitors and compensates for this effect.

Specifically, in the embodiment of FIG. 2, the output of the first EOPM 204 is divided between a seed beam 206 that is directed to the pulsed laser 106 and second reference path 208 that is combined with the first reference path 202 after the second EOPM 212 and directed to a detector 210 such as a photodiode detector. A second EOPM 212 included in the second reference path 208 is used to adjust the two reference paths 202, 208 such that they are in phase when the phase shift of the first EOPM 204 is zero, i.e. when the first control voltage 214 applied to the first EOPM 204 is zero. In embodiments, the lengths of the two reference paths 202, 208 are adjusted such that the "second" control voltage 216 that must be applied to the second EOPM 212 to cause the two reference paths 202, 208 to be in phase is low.

The first control voltage 214 is then adjusted to a "first" value "V" that causes the two reference beams 202, 208 to be opposite in phase at the detector 210, indicating a phase shift of the seed path by the first EOPM 204 of 180 degrees. This "first value" V of the first control voltage 214 is then actively regulated, based on the output of the detector 210, so as to maintain the 180 phase shift of the first EOPM 204.

In the embodiment of FIG. 2, the second control voltage 216 includes a DC component produced by a voltage source 218 combined with a frequency-modulated component produced by a low frequency signal generator 220. When the second EOPM 204 is properly adjusted and the two reference paths 202, 208 are 180 degrees out of phase, a minimum response is produced by the detector 210. The frequency modulation of the second control voltage 216 causes the detector output 222 to oscillate, such that it can be detected by a frequency discriminator such as a lock in detector 224 to which a reference signal 226 is supplied from the low frequency signal generator 220. The output 228 of the lock in detector 224 is then used to regulate the value of "V." In similar embodiments, the output of the detector 210 is used directly as the regulation voltage 228.

In the embodiment of FIG. 2, the regulation voltage 228 is directed to a servo 230 that periodically or continuously adjusts the source 232 of the first control voltage 214.

Based on the calibrated and regulated level V of the first control voltage that provides a reliable phase shift of the first EOPM 204 of 180 degrees, accurate phase shifts of other values can be produced by appropriate increases or reductions of V. In the embodiment of FIG. 2, the output of the first control voltage source 232 is directed to a first relay 236, and also to a voltage divider 234. The first relay 236 is thereby used to select the first control voltage 214 from between the output of the first control voltage source 232, which is V, and the divided output from the voltage divider 234, thereby shifting the seed beam 206 between two phases. Accordingly, the speed with which the phase of the seed laser 100, and thereby the phase of the pulse laser 106, can be shifted depends mainly on the phase shift speeds of the first relay 236 and the first EOPM 204, which are quite fast. In embodiments, the voltage divider 236 reduces the first control voltage V by 50%, so that the two output phases are in quadrature.

The embodiment of FIG. 2 further includes a second relay 238 that acts as a switch to temporarily turn off the regulation of V when the phase of the seed beam 206 is shifted away from 180 degrees, and also during certain steps of the setup and calibration of the system.

Table 1 summarizes steps that are included in embodiments of a method of calibrating the disclosed apparatus.

TABLE 1

Steps for calibrating and regulating the relative laser pulse output phases of pulse pairs

| Step | Action | DC1 | DC2 | LO | TTL1 | TTL2 |
|---|---|---|---|---|---|---|
| 1 | Maximize photodiode signal using EOPM2 to bring both reference paths into phase with each other | Off | Adjust to maximize detector signal | Off | On | Off |
| 2 | Minimize detector signal using EOPM1 to introduce a 180 degree phase shift between reference paths | Adjust to minimize detector signal | Hold constant | Off | On | Off |
| 3 | Lock to the 180 degree out of phase point by dithering EOPM2. Use the locking error signal to update DC1 using a servo loop. | Adjust with servo | Hold constant | On | On | On |
| 4 | Directly after the first pulse in the doublet, use the divider to cut the control voltage V to EOPM 1 in half by switching TTL1 off. TTL2 is also switched off so that DC1 is not updated. | Hold Constant (EOPM 1 receives half of DC1 because TTL1 is turned off) | Hold constant | On | Off | Off |
| 5 | After the second pulse, restore EOPM 1 to its 180 degree phase shift by switching both TTLs back on. | Adjust with Servo | Hold constant | On | On | On |
| 6 | Repeat steps 4-5 | | | On | Variable | Variable |
| 7 | Repeat steps 1-2 periodically (about every 10-100 s) to calibrate DC2 | Adjust for appropriate phase relationships | Adjust for appropriate phase relationships | Off | On | Off |

Figure 3:
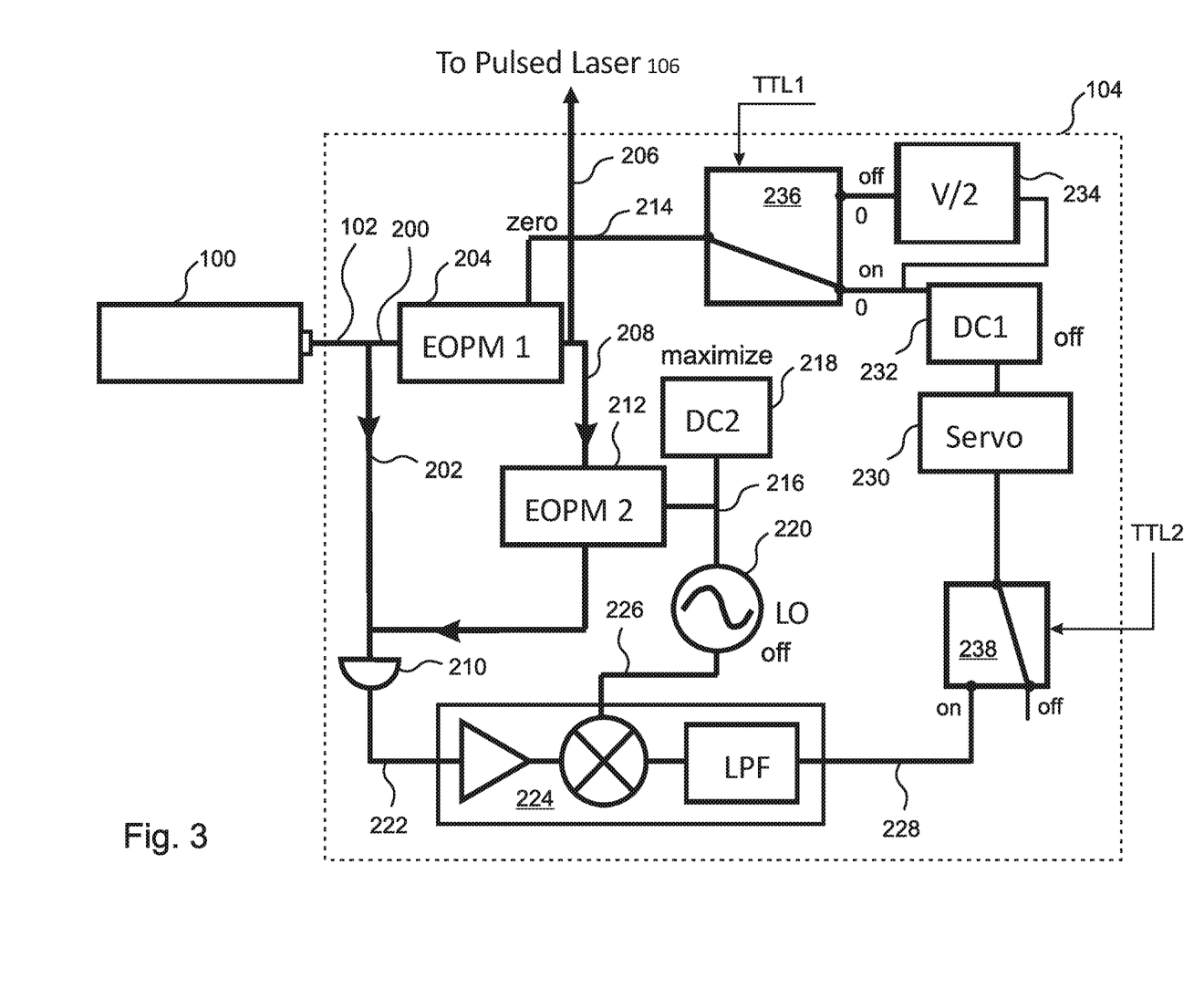
FIG. 3 illustrates the block diagram of FIG. 2 configured according to a second step of a disclosed method of calibrating and using the phase controller.

With reference to the first line of Table 1 and to FIG. 3, in embodiments the first step of the disclosed calibration and regulation method is to set the output of the first control voltage source 232 to zero, so that the phase shift of the first 204 EOPM is zero. The TTL 2 input to the second relay 238 is switched off to disable the feedback loop, the low frequency source 220 is switched off to omit the dithering, and the second control voltage source 218 is adjusted to vary the phase shift of the second EOPM 212 until a maximum signal is obtained from the detector 210. In embodiments, the path lengths of the two reference paths 202, 208 are adjusted such that only a small phase shift is required from the second EOPM 212 to obtain this in-phase adjustment.

Figure 4:
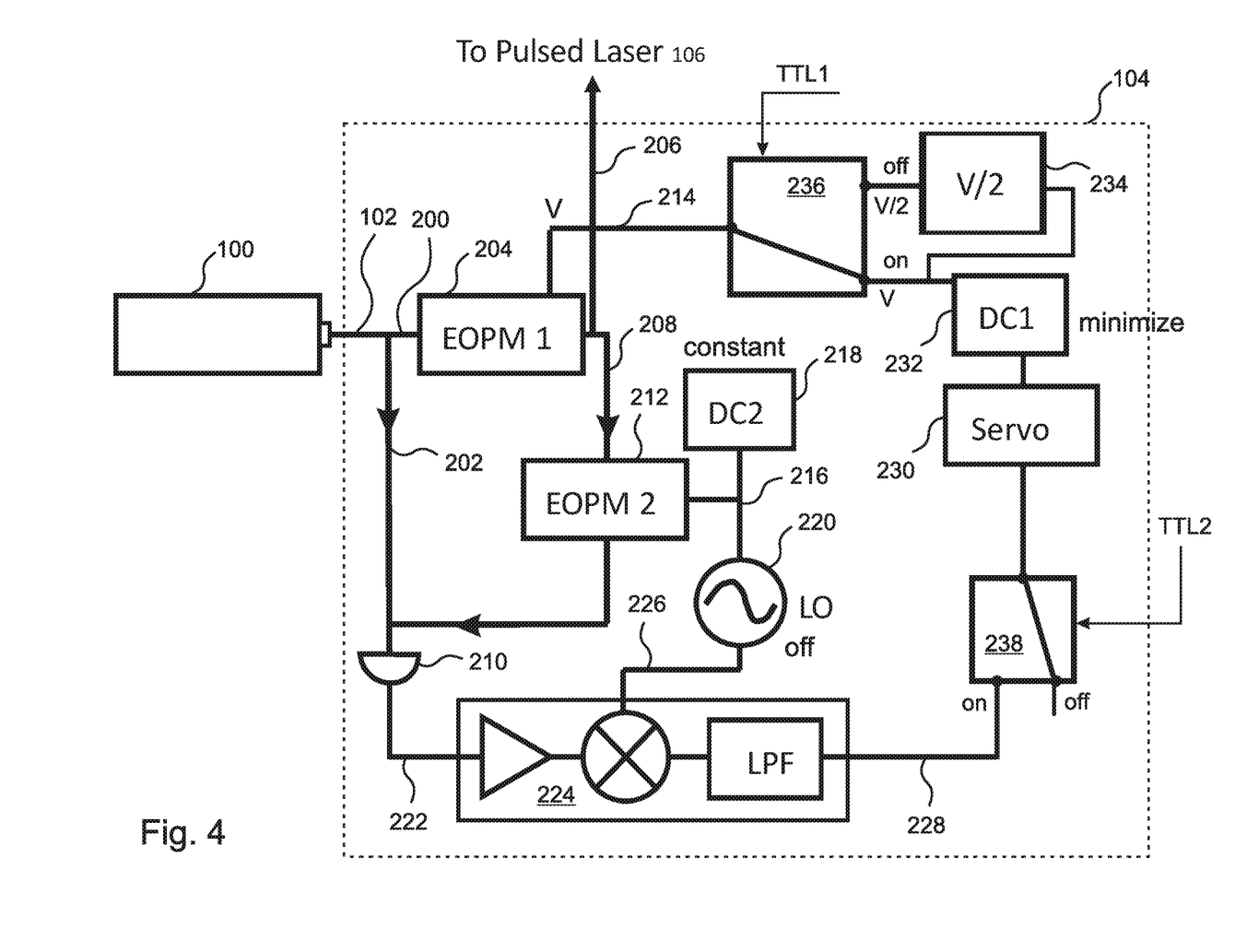
FIG. 4 illustrates the block diagram of FIG. 2 configured according to a third step of a disclosed method of calibrating and using the phase controller.

With reference to the second line of Table 1 and to FIG. 4, the output of the first control voltage source 232 is then increased while the output of the second control voltage source 218 is held constant until a minimum signal is obtained from the detector 210, indicating that the phase shift of the first EOPM 204 is 180 degrees. The resulting value of the control voltage 214 is "V."

Figure 5:
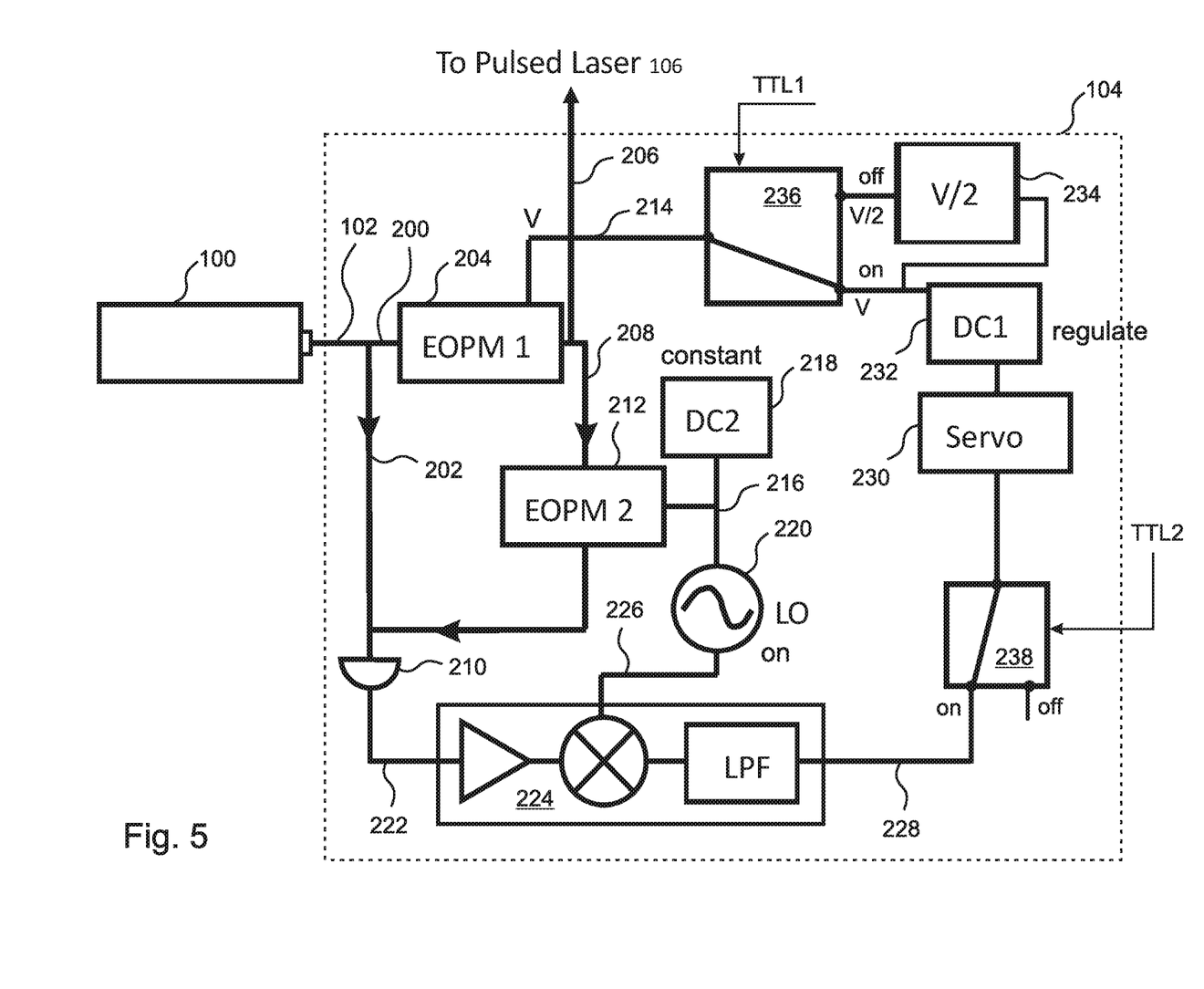
FIG. 5 illustrates the block diagram of FIG. 2 configured according to a fourth step of a disclosed method of calibrating and using the phase controller.

With reference to the third line of Table 1 and to FIG. 5, the TTL 2 input to the second relay 238 is then switched on to enable the feedback loop and the low frequency source 220 is switched on to introduce dithering into the second control voltage 216, so that the first control voltage source 232 is regulated to maintain V at a value that causes the phase shift of the first EOPM 204 to be 180 degrees.

Figure 6:
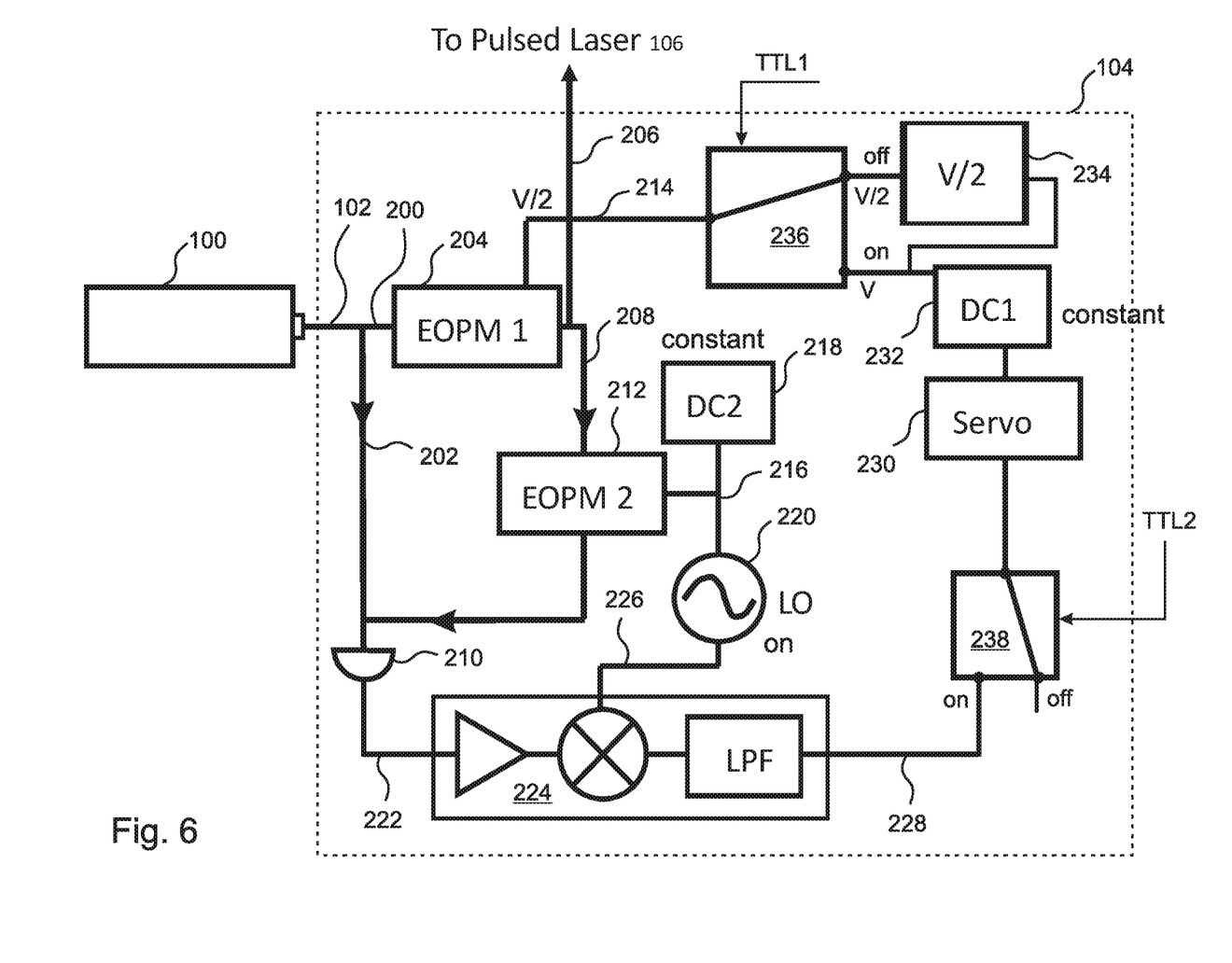
FIG. 6 illustrates the block diagram of FIG. 2 configured according to a fifth step of a disclosed method of calibrating and using the phase controller.

With reference to the fourth line of Table 1 and to FIG. 6, after the first pulse of the laser pulse doublet 108, the TTL 2 input to the second relay 238 is temporarily switched off to disable the feedback loop and the first control voltage source 232 is held constant at output level V, while the TTL 1 input to the first relay 236 is switched off, so that the control voltage 214 is selected from the voltage divider 234, causing a phase shift in the seed beam 206. In embodiments where the disclosed apparatus is used for quadrature LiDAR detection, the voltage divider 234 is configured to reduce the output of the first control voltage source 232 by 50%, thereby causing a phase shift of the seed beam 206 of 90 degrees.

With reference to the fifth line of Table 1, after the second pulse of the laser pulse doublet 108, the apparatus is returned to the configuration of FIG. 5. With reference to line 6 of Table 1, as doublet pulses are generated, the system is switched between the configurations of FIG. 5 and FIG. 6 as needed to create the desired phase shifts. And with reference to line 7 of Table 1, in embodiments the first two steps of the calibration method are repeated periodically, for example every 10-100 seconds, so as to maintain the calibration of the phase shift of the second EOPM 212.

Figure 7:
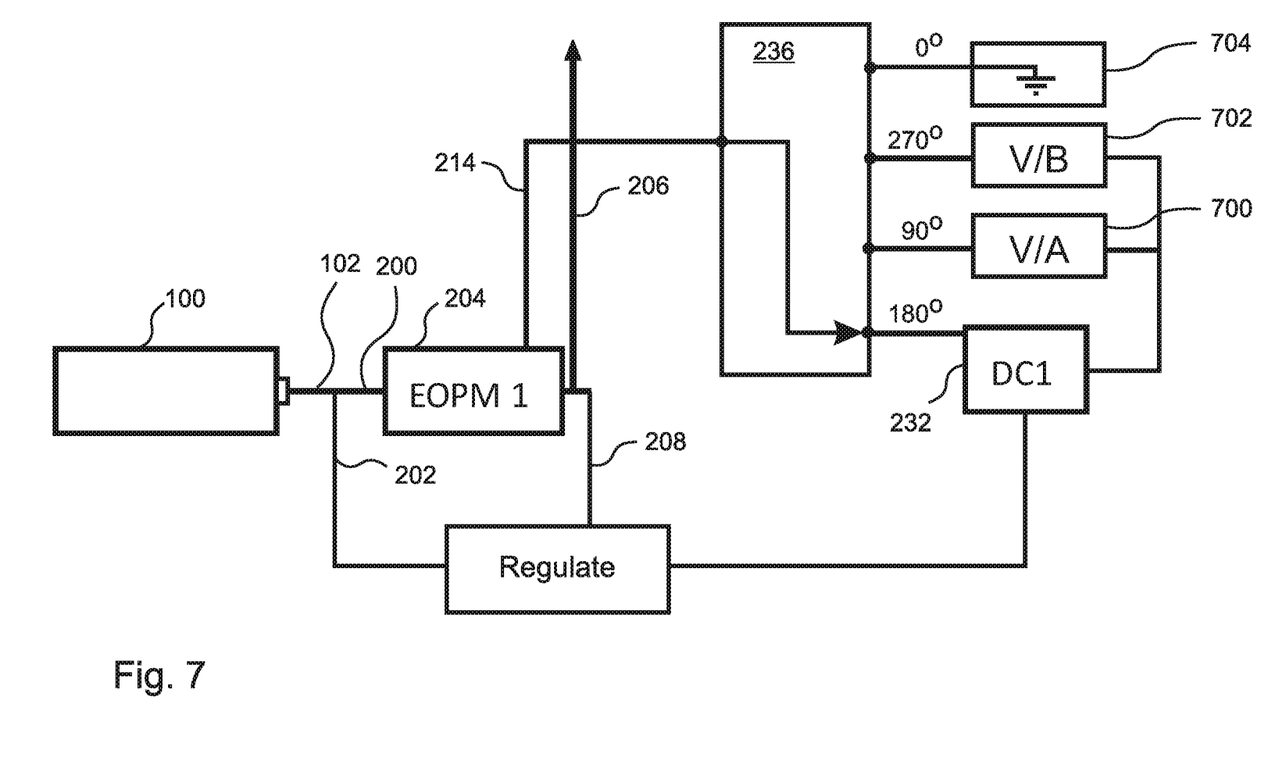
FIG. 7 is a block diagram that illustrates an embodiment that can be shifted between more than two phases.

It will be understood that the present system is not limited to only LiDAR quadrature detection, and indeed is not limited to the generation of only two pulse phases. For example, with reference to FIG. 7, embodiments include a plurality of voltage "dividers" or shifters 700, 702, 704 that can be used to generate a plurality of laser phase shifts, for example, of 0, 90, 180, and 270 degrees, or of any desired number and values. Note in particular that, in the embodiment of FIG. 7, one of the voltage shifters 702 is configured to increase the control voltage to be greater than V, while another of the voltage shifters 704 is configured to set the control voltage to zero, thereby providing an output that is 180 degrees out of phase with V.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications without departing from the spirit thereof. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

We claim:

1. A phase control apparatus for accurately shifting the output of a continuous wave (cw) laser between two phases, the apparatus comprising:
   a first voltage-controlled phase shifter configured to receive an input laser signal from the cw laser and provide a laser seed beam and a reference signal;
   a first phase shifter control system, comprising:
      an adjustable first control voltage source, configured to generate a first control voltage;
      a voltage shifter, configured to shift the first control voltage by a specified percentage; and
      a voltage selector configured to select between an output voltage from the first control voltage source and an output voltage of the voltage shifter, and to apply the selected output voltage to control the first phase shifter;
   a second voltage-controlled phase shifter, configured to adjust a phase of the reference signal to produce a phase adjusted reference signal;
   an adjustable second control voltage source, configured to apply a second control voltage to the second voltage-controlled phase shifter;
   a detector, configured to provide a detector output that is responsive to the input laser signal and the phase adjusted reference signal, such that the detector output varies according to constructive and destructive interference between the input laser signal and the phase adjusted reference signal; and
   a feedback system configured to adjust the first control voltage source so as to minimize the detector output.

2. The apparatus of claim 1, wherein the first and second phase shifters are electro-optic phase modulators.

3. The apparatus of claim 1, wherein the cw laser is an infra-red laser.

4. The apparatus of claim 1, wherein the detector is a photodiode detector.

5. The apparatus of claim 1, wherein the feedback system includes a servo that adjusts the first control voltage source.

6. The apparatus of claim 1, further comprising a switch configured to enable and disable control of the first control voltage source by the feedback system.

7. The apparatus of claim 1, wherein the feedback system comprises:

a signal generator that imposes a time-variation onto the second control voltage, thereby imposing the time-variation onto the detector output; and a frequency discriminator configured to discriminate and isolate a component of the detector output upon which the time-variation has been imposed, said frequency discriminator being configured to receive a reference signal from the signal generator.

8. The apparatus of claim 7, wherein the frequency discriminator is a lock in amplifier.

9. The apparatus of claim 1, wherein the voltage shifter is configured to reduce the first control voltage by fifty percent.

10. The apparatus of claim 1, wherein the apparatus comprises a plurality of voltage shifters, and the voltage selector is configured to select between any of the output voltage from the first control voltage source and the output voltages of the voltage shifters.

11. The apparatus of claim 10, wherein the apparatus comprises three voltage shifters and is able to shift the output beam between four quadrature phases.

12. A method of shifting a phase of a continuous wave (cw) laser output, the method comprising:

directing the cw laser output through a phase control apparatus to produce a laser seed beam having a laser seed phase, the phase control apparatus being controlled by a first control voltage;

detecting an interference between the cw laser output and the laser seed beam, and determining therefrom a value V of the first control voltage at which a seed beam phase shift of the laser seed beam is 180 degrees as compared to a phase of the laser seed beam when the first control voltage is zero;

configuring a voltage shifter to provide a shifted output voltage that is a specified fraction of V, said fraction being designated as F;

regulating V to maintain the seed beam phase shift at 180 degrees; and when a change of the output phase is desired, disabling the regulation and causing a voltage selector to direct the shifted output voltage to the phase control apparatus in place of the first control voltage, thereby changing the seed beam phase shift to a value equal to 180 degrees times F.

13. The method of claim 12, further comprising causing the voltage selector to select the first control voltage and switching the feedback system on, thereby returning the seed beam phase shift to 180 degrees.

14. The method of claim 12, further comprising periodically repeating the step of detecting the interference between the cw laser output and the laser seed beam, and determining therefrom the value V of the first control voltage at which the seed beam phase shift is 180 degrees.

15. A method of obtaining quadrature LiDAR detection, the method comprising:

providing a pulsed laser, a continuous wave (cw) laser, and a phase control apparatus configured to direct an output of the cw laser through a voltage-controlled phase shifter to provide a seed beam to the pulsed laser;

detecting an interference between the output of the cw laser and the seed beam, and determining therefrom a value V of a first control voltage at which a seed beam phase shift of the seed beam is 180 degrees as compared to a phase of the seed beam when the first control voltage is zero;

configuring a voltage shifter to provide a shifted output voltage that is one half of V;

regulating V to maintain the seed beam phase shift at 180 degrees;

causing the pulsed laser to emit a first laser pulse;

detecting a first LiDAR response as a first component of the quadrature LiDAR detection;

causing the voltage selector to direct the shifted output voltage to the phase shifter in place of V, thereby changing the seed beam phase shift to approximately 90 degrees;

causing the pulsed laser to emit a second laser pulse; and detecting a second LiDAR response as a second component of the quadrature LiDAR detection.

16. The method of claim 15, wherein the pulsed laser is an infrared laser.

* * * * *